United States Patent
Charrier et al.

(10) Patent No.: US 6,411,909 B1
(45) Date of Patent: Jun. 25, 2002

(54) DEVICE FOR MEASURING THE FLUID CONSUMPTION OF A USER OVER A GIVEN TIME

(75) Inventors: Christophe Charrier, Asnieres sur Seine (FR); Véronique Dulphy Vigor, Chicago, IL (US); Antoine Willemot, Gif sur Yvette; Patrick Dilly, Versailles, both of (FR); Xavier Vigor, Chicago, IL (US); Dominique Jouvaud, Paris (FR)

(73) Assignee: L'Air Liquide Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/425,060

(22) Filed: Oct. 22, 1999

(30) Foreign Application Priority Data

Oct. 22, 1998 (FR) .............................................. 98 13265

(51) Int. Cl.[7] .................................................. G01F 1/00
(52) U.S. Cl. ................. 702/45; 250/227.21; 73/861.28; 367/89; 700/28; 702/47; 702/100
(58) Field of Search ........................... 702/45, 100, 47; 700/28, 9; 73/861.86, 861.28; 250/227.21

(56) References Cited

U.S. PATENT DOCUMENTS

| 4,149,254 A | * | 4/1979 | Molusis ........................ 702/47 |
| 4,200,911 A | * | 4/1980 | Matsumoto ................... 700/28 |
| 4,384,491 A | * | 5/1983 | Brown et al. ............. 73/861.28 |
| 4,633,719 A | * | 1/1987 | Vander Heyden ........ 73/861.28 |
| 4,987,297 A | * | 1/1991 | Le Squin et al. ....... 250/227.21 |
| 5,012,449 A | * | 4/1991 | Todd ........................... 367/89 |
| 5,553,505 A | * | 9/1996 | Bignell et al. ............ 73/861.28 |
| 5,748,504 A | * | 5/1998 | Fletcher-Haynes .......... 702/100 |

FOREIGN PATENT DOCUMENTS

| AT | 397 870 | 7/1994 |
| EP | 0 024 488 | 3/1981 |
| EP | 0 507 101 | 10/1992 |

* cited by examiner

Primary Examiner—John S. Hilten
Assistant Examiner—John Le
(74) Attorney, Agent, or Firm—Young & Thompson

(57) ABSTRACT

The invention relates to a device for measuring the fluid consumption of a user over a given measurement time, including a volumetric meter (26) connected to a central information processing unit (28). This unit is designed to take a series of readings at successive intervals in said measurement time, so as to compare each reading with a reference value that corresponds to a predetermined nominal consumption threshold and thus from this deduce the quantity consumed over said measurement time corresponding to consumption with a flow rate higher than the nominal consumption threshold.

5 Claims, 2 Drawing Sheets

DEVICE FOR MEASURING THE FLUID CONSUMPTION OF A USER OVER A GIVEN TIME

BACKGROUND OF THE INVENTION

The present invention relates to a device for measuring the fluid consumption of a user over a given measurement time of the type comprising a meter arranged upstream of the user connection point, which meter is designed to measure a quantity of fluid delivered to the user during a space of time under consideration, and, connected to said meter, an information processing unit including means of evaluating the quantity of fluid measured by said meter.

DESCRIPTION OF RELATED ART

It is known practice for users to be provided with a nitrogen-production unit in order to meet their requirements for fluid.

This unit is rated to supply a nominal flow rate required by the user. This nominal flow rate is determined from a predicted estimate of the instantaneous consumptions. However, the user's requirement for gas may vary over time, and in particular may exhibit spikes in the consumption.

To constantly satisfy the user's requirements, the production unit conventionally includes a gas production machine associated, in parallel, with a gas storage tank. Thus, during peak consumption time, when the machine alone is unable to supply the gas required, gas is drawn from the storage tank.

The storage tank is generally replenished periodically, for example using a tanker truck.

The cost prices of the gas produced by the production machine and of the gas from the storage tank are different. It is thus permissible for the gas supplier, who owns the installation, to invoice the user at different rates for the gas from the production machine and for the gas from the storage tank, the rate applied to the gas from the tank being higher than the rate applied to the gab produced by the machine.

For this reason, the gas production installation has two volumetric meters, one of them arranged immediately at the outlet of the gas production machine and the other arranged immediately at the outlet of the storage tank.

These meters are read periodically, for example every month, and the quantities of gas read off each meter are charged at the corresponding rate.

The device for measuring the consumption is not fully satisfactory as it assumes that the gas production machine is capable of constantly maintaining a stable flow rate equal to the nominal flow rate agreed with the user.

Thus, in practice, if the performance of the machine is below the nominal performance, a high quantity of gas is taken from the storage tank, and this results in an increase in cost to the user.

By contrast, if the machine performance is better than the required performance, recourse to the storage tank is raze, which means that the flow rate does not reflect the user's increase in consumption.

Likewise, in the event of a succession of significant fluctuations in the actual flow rate of the machine about the nominal flow rate, the quantity of gas extracted from the storage tank bears no relation to the phases in which the user exceeds its nominal flow rate. Thus, the volumes measured by the sensors do not correspond to the service actually provided to the user.

SUMMARY OF THE INVENTION

The object of the invention is to provide a device for measuring the consumption of fluid which does not have the disadvantages mentioned hereinabove and which, in a simple way, allows the quantities consumed by the user and corresponding to flow rates higher than a determined nominal flow rate to be determined accurately.

To this end, the subject of the invention is a device for measuring the fluid consumption by a user over a given time, at the aforementioned type, characterized in that said information processing unit includes:

means for storing at least one nominal consumption threshold in memory;

means of reading the meter during said given time at successive moments so as to determine the quantity of fluid delivered to the user over each interval defined between two successive moments;

means of comparing, across each interval, measured quantities with at least one reference value which represents the or each nominal threshold across the interval under consideration;

means of summing, across all of the intervals covering said measurement time, the amounts by which each measured quantity exceeds the or each reference value for the interval under consideration; and means of summing, across all the intervals covering said measurement time, that portion of each measured quantity that is below the or each reference value for the interval under consideration.

According to particular embodiments, the measurement device includes one or more of the following features:

the duration of each interval is shorter than the mean period of the fluctuations of the user's consumption over time about the nominal consumption threshold;

the durations of all the intervals of said measurement time are equal; and the meter is designed to measure the volume of fluid consumed, and the or each reference value for each interval is equal to the volume of fluid which should be consumed during the interval under consideration for consumption that corresponds to the or each nominal consumption threshold.

Another subject of the invention is the application of such a device to the supply of a gas, particularly a gas or gaseous mixture separated from the air.

BRIEF DESCRIPTION OF THE DRAWINGS

The invention will be better understood from reading the description which will follow, which is given merely by way of example and made with reference to the drawings in which.

DESCRIPTION OF THE PREFERRED EMBODIMENTS

Figure 1:
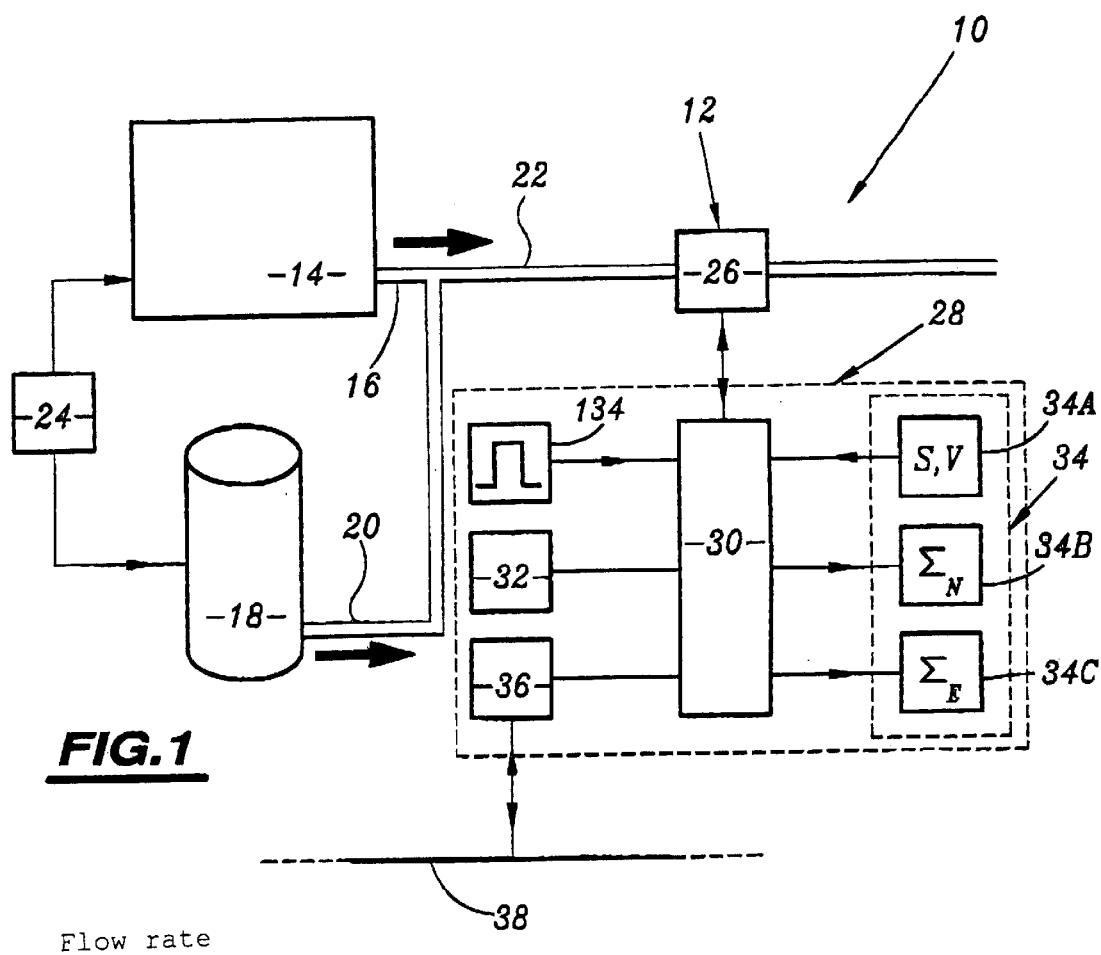
FIG. 1 is a diagrammatic view of a measurement device according to the invention installed in an installation for supplying nitrogen.

The installation depicted by way of example in FIG. 1 includes a unit 10 for supplying nitrogen, at the outlet of which there is a device 12 for measuring consumption according to the invention.

The installation 10 includes a production machine 14 intended to produce gaseous nitrogen from atmospheric air. The nitrogen produced by the machine 14 is conveyed to the user along a pipe 16.

A storage tank 18 is mounted in parallel with the production machine 14. This tank is connected to the user by a pipe 20. The pipes 20 and 16 converge into a single distribution pipe 22 supplying the user.

The production machine 14 and the tank 18 are controlled by a control unit 24 designed to cause nitrogen to be taken from the tank 18 when the user's requirement is high and production machine 14 is unable alone to meet this requirement.

The device 12 for measuring consumption includes a volumetric meter 26 mounted on the distribution pipe 22. The meter 26 is connected to an information processing unit 28 by a two-way data transfer link.

The processing unit includes a computer 30 connected to a memory 32 in which there is stored a program for controlling the information processing unit 28. Furthermore, the processing unit 28 includes a clock 134 allowing the operations performed by the computer 30 under the control of the program to be sequenced.

The computer 30 is connected to a memory 34 which has a memory zone 34A in which a nominal consumption threshold S is stored.

This nominal consumption threshold S corresponds to the contractual quantities that are to be delivered as agreed between the user and the supplier of the gas. It corresponds to the user's predicted consumption over time. This threshold is, for example, equal to the predicted flow rate. This is, for examples 1000 m$^3$/h, in the case of the supply of nitrogen.

The memory zone 34B is intended for storing the quantity $\Sigma_N$ corresponding to the sum of the quantities of gas consumed by the user short of the nominal conditions correspond [sic] to the nominal threshold S.

A last memory zone 34C is intended for storing the quantity $\Sigma_N$ corresponding to the sum of the quantities of gas consumed by the user in excess of the nominal conditions corresponding to the nominal threshold S. Thus, the quantity $\Sigma_N$ corresponds to the quantities consumed above the quantities set by the nominal threshold S.

Finally, the information processing unit 28 includes transmission/reception means 36 designed for transmitting data between the information processing unit 28 and a remote site using a data transmission network 38 such as the telephone network.

The measurement taken by the device is taken over a given time T. This measurement time is divided into a set of successive intervals of time denoted I.

The duration of each interval I is advantageously shorter than the mean period of the fluctuations in the user's consumption over time about the nominal consumption threshold S.

A reference value V is calculated by the computer 30 and stored in the memory zone 34A. This reference value V is equal to the theoretical quantity of gas which is to be measured by the meter 26 during a determined interval of time I for a flow rate which corresponds to the nominal threshold S over the interval I under consideration.

If the nominal threshold S is the gas flow rate, the value V is equal to the nominal flow rate S multiplied by the duration of the interval I. All the intervals I are advantageously made equal.

Figure 2:
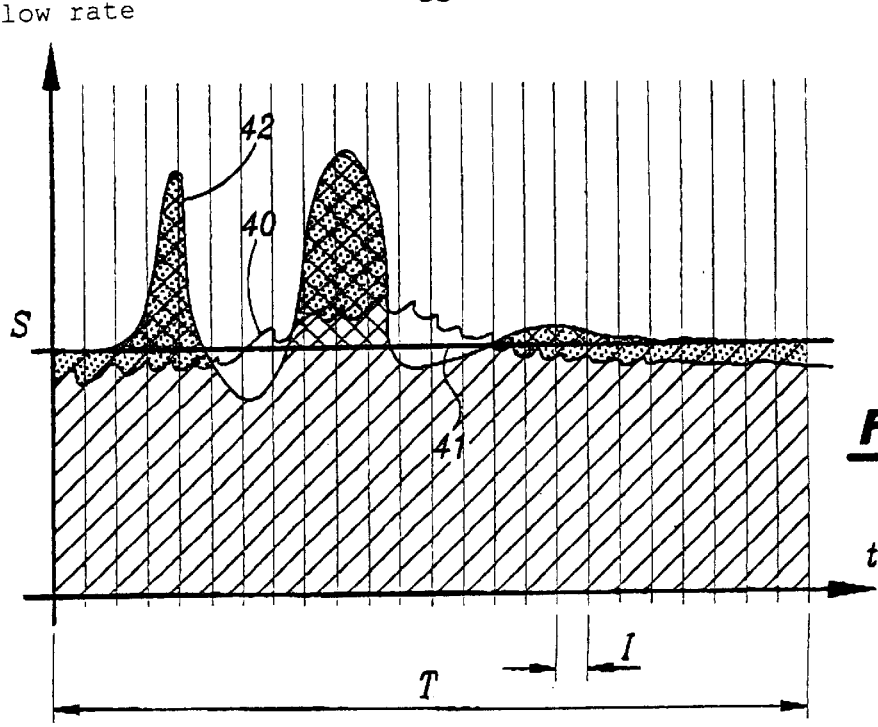
FIG. 2 is a graph showing the change in the quantities measured by the measurement device of FIG. 1.

The curve depicted in FIG. 2 corresponds to the change in flow rate over the given measurement time T. The measurement time is, for example, an invoicing period, equal to 30 days.

The measurement time T is subdivided into a set of one-minute intervals I.

FIG. 2 more specifically depicts the change over time in flow rate produced by the machine 14 and consumed by the user.

The flow rate produced by the machine 14 is denoted by the reference 40. It fluctuates approximately about the nominal consumption threshold S depicted by the straight line 41, The flow rate consumed by the user as a function of time is depicted by the curve 42. In the example described, there are two consumption spikes, each followed by a phase of lower consumption which drops below the nominal threshold S.

During the consumption spikes, the nitrogen supplied comes at least partially from the tank 18 as indicated by the zones marked with dots in FIG. 2 and corresponding to the areas lying between the curves 40 and 42.

Figure 3:
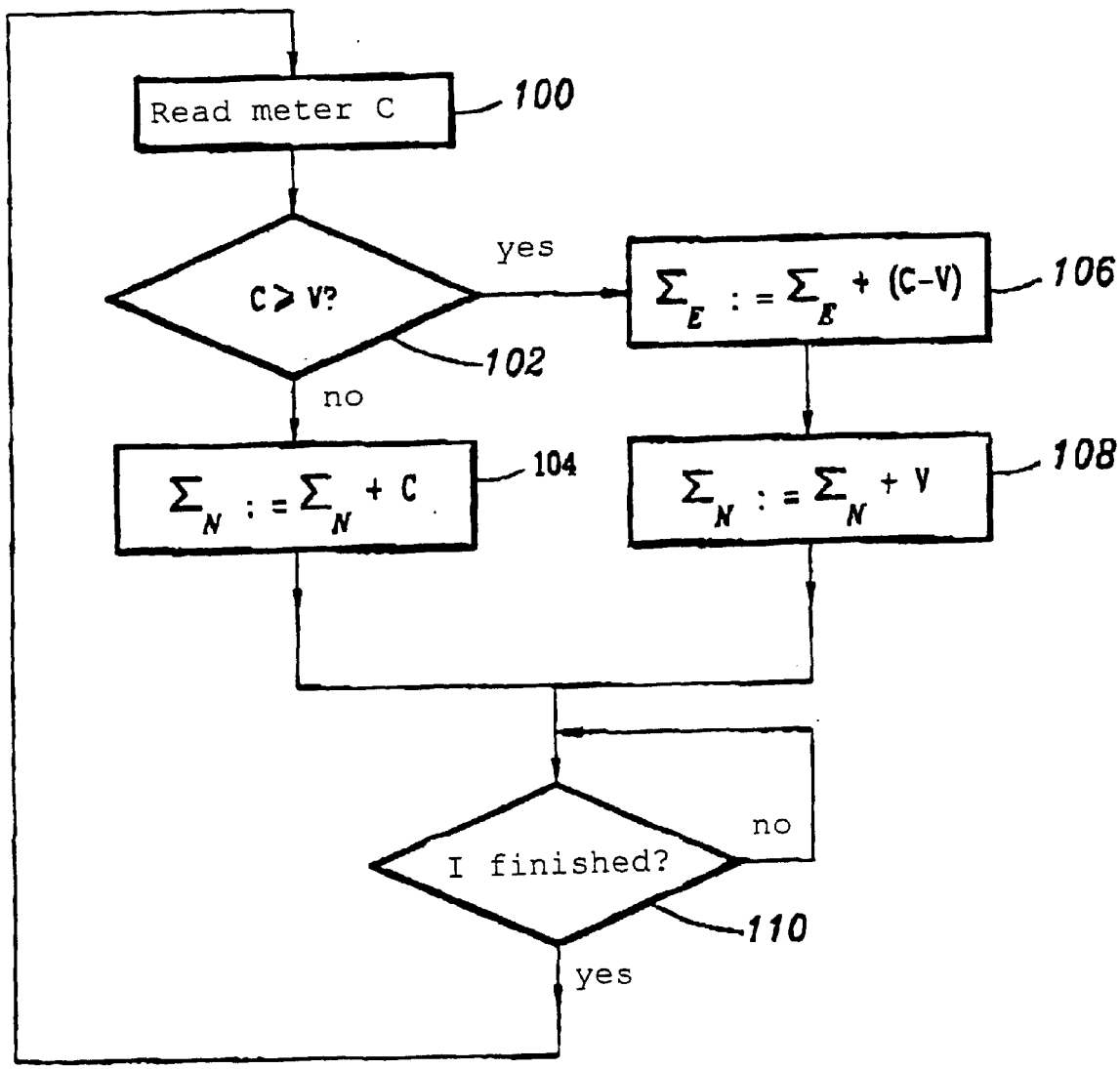
FIG. 3 is a flow chart of the program employed in the measurement device.

A flow chart for the program used by the information processing unit 28 is depicted in FIG. 3.

At the start of each measurement time T, the quantities $\Sigma_N$ and $\Sigma_E$ are set to zero.

Throughout the measurement time T, at the initial moment of an interval I, the computer 30, in step 100, reads the quantity C consumed by the user in the interval under consideration. The quantity C is determined by the difference between the values read by the meter 26 at the beginning and end of the interval I under consideration.

Information sent by the clock 34 to the computer 30 under the control of the program stored in the memory 32 allows these periodic readings of the quantities measured by the meter 26 to be made. These quantities correspond to the volumes of gas which have passed through the meter.

In step 102, the computer checks whether the quantity C is higher than the reference threshold V.

If it is not, the computer 30 in step 104 determines the new value of $\Sigma_N$, by adding the quantity C to the previous value.

This scenario corresponds to an interval I in which the quantity of gas consumed is below the reference value, that is to say to an interval I during which the flow rate consumed by the user is below the agreed nominal threshold S.

By contrast, if the quantity C is higher than the reference value V, which corresponds to the scenario in which the flow rate during the interval under consideration is higher than the nominal threshold S, the computer 30 in step 106 determines the new value of $\Sigma_E$ by increasing the latter by the difference between the quantity consumed during the interval I and the reference value V.

Furthermore, in step 108, the total $\Sigma_N$ is updated by increasing it by the reference value V.

At the end of step 104 or of steps 106 and 108, the program, at step 110, waits for the end of the interval I.

When this interval has finished, the duration of the interval I being measured using the clock 134, a new reading of the meter 26 is taken in step 100.

It will be understood that with such a device it is possible to determine accurately each of the intervals during which the flow rate consumed by the user exceeds the nominal threshold S and to add up, during these intervals, the quantities consumed in excess of the reference value V which corresponds to the nominal threshold S.

By contrast, during the phases in which the flow rate consumed falls short of the nominal threshold S, the quantities actually consumed are added up in $\Sigma_E$ As depicted in FIG. 2, the quantities $\Sigma_n$, $\Sigma_E$ are independent both of the quantities produced by the machine 14 and of the quantities taken from the tank 18. This is because the quantity $\Sigma_N$ corresponds to the hatched area defined under the curves 40 or 41, whereas the quantity $\Sigma_E$ corresponds to the cross-hatched area between the curves 42 and 41.

Thus, these values depend only on the nominal threshold S and, in particular, on the corresponding reference value V. By contrast, the quantities read do not depend on the rating of the machine 14 or on its efficiency.

It is thus possible to use the quantities $\Sigma_E$ and $\Sigma_N$ to calculate the real price of the service provided on the basis of the predetermined nominal threshold S.

As an alternative, several nominal consumption thresholds S are stored in memory and, across each interval I, the measured quantity is compared with several reference values V which represent the various thresholds. The summing means 30, 34C then sum the excesses of each measured quantity compared with each reference value V.

Likewise, those parts of each measured quantity below each reference value V are summed by the summing means 30 and 34B.

It is thus possible to determine a selling price for the fluid supplied, taking several threshold values into consideration.

What is claimed is:

1. Device for measuring the fluid consumption of a user over a given measurement time of the type comprising a meter arranged upstream of the user connection point, which meter is designed to measure a quantity of fluid delivered to the user during a space of time under consideration, and, connected to said meter, an information processing unit including means of evaluating the quantity of fluid measured by said meter, said information processing unit comprising:

means for storing at least one nominal consumption threshold in memory;

means of reading the meter during said given time at successive moments so as to determine the quantity of fluid delivered to the user over each interval defined between two successive moments;

means of comparing, across each interval, measured quantities with at least one reference value which represents the or each nominal threshold across the interval under consideration;

means of summing, across all of the intervals covering said measurement time, the amounts by which each measured quantity exceeds the or each reference value for the interval under consideration; and means of summing, across all the intervals covering said measurement time, that portion of each measured quantity that is below the or each reference value for the interval under consideration, wherein the duration of each interval is shorter than the mean period of the fluctuations of the user's consumption over time about the nominal consumption threshold.

2. Measurement device according to claim 1, wherein the durations of all the intervals of said measurement time are equal.

3. Measurement device according to claim 1, wherein the meter is designed to measure the volume of fluid consumed, and the or each reference value for each interval is equal to the volume of fluid which should be consumed during the interval under consideration for consumption that corresponds to the or each nominal consumption threshold.

4. Device according to claim 1, wherein the fluid being measured is a gas and the device further comprises a connection to a supply of the gas.

5. Device according to claim 4, wherein the gas is a gas of the air.

* * * * *